United States Patent [19]

Muraoka et al.

[11] 4,167,151
[45] Sep. 11, 1979

[54] AUTOMATIC SPRAYING APPARATUS FOR FORMING HARD POLYURETHANE FOAM COATING

[75] Inventors: Mamoru Muraoka, Yokohama; Kikuo Shimada, Yokosuka; Hiroshi Komada, Kobe; Toshiyuki Gami, Akashi, all of Japan

[73] Assignees: Sumitomo Heavy Industries, Ltd., Tokyo; Nihon Soflan Chemical & Engineering Co. Ltd., Osaka, both of Japan

[21] Appl. No.: 877,965

[22] Filed: Feb. 15, 1978

Related U.S. Application Data

[63] Continuation-in-part of Ser. No. 614,967, Sep. 19, 1975, abandoned.

[30] Foreign Application Priority Data

Nov. 1, 1974 [JP] Japan ................................ 49-125354

[51] Int. Cl.² .......................... B05C 5/00; B05C 11/10
[52] U.S. Cl. .................................... 118/665; 118/704; 118/323
[58] Field of Search ...................... 118/323, 305, 7, 8, 118/9; 324/61 R; 239/186, 187; 156/78; 425/4 C; 427/373; 52/1, 749

[56] References Cited

U.S. PATENT DOCUMENTS

| | | | |
|---|---|---|---|
| 2,824,281 | 2/1958 | Radnor | 324/61 R |
| 3,233,576 | 2/1966 | Voelker | 118/106 X |
| 3,269,882 | 8/1966 | Willy | 156/78 |
| 3,391,494 | 7/1968 | Dye, Jr. | 118/323 |
| 3,510,374 | 5/1970 | Walker | 118/9 X |
| 3,548,453 | 12/1970 | Garis | 425/4 C |
| 3,702,747 | 11/1972 | Porter et al. | 425/4 C |

*Primary Examiner*—John P. McIntosh
*Attorney, Agent, or Firm*—Armstrong, Nikaido, Marmelstein & Kubovcik

[57] ABSTRACT

An automatic spraying apparatus comprising storage tanks each storing therein each one of at least two liquid components which are mixed to produce hard urethane foam, a pump for feeding said each liquid component under pressure, a spray gun for mixing said liquid components fed from said pumps and spraying the mixture, a mechanism for displacing said spray gun in a plane spaced apart from and substantially in parallel with a surface to be sprayed, and a control unit for controlling the displacement of said spray gun so as to follow a predetermined path.

6 Claims, 10 Drawing Figures ion-in-part of
AUTOMATIC SPRAYING APPARATUS FOR FORMING HARD POLYURETHANE FOAM COATING

CROSS REFERENCE TO RELATED APPLICATION

The present application is a continuation-in-part of copending application Ser. No. 614,967, filed Sept. 19, 1975, now abandoned.

BACKGROUND OF THE INVENTION

The present invention relates to an automatic spraying apparatus used for forming hard polyurethane foam coatings.

Hard polyurethane foam, which is one of the foamed plastics used as the heat insulating material, is known to have some peculiar properties that it has a very low thermal conductivity, that it may be foamed at any desired place and that it exhibits the strong adhesion to the surface to be coated.

Polyurethane foaming methods are divided roughly into two methods of the pouring method in which polyurethane foam feed stock is poured into a mold or the like and the spraying method in which the feed stock is directly sprayed upon the surface to be coated so that the layer of the hard polyurethane foam coating may be formed. Since the spraying method does not use the molds or the like, it is very advantageous and simple when used for forming the heat insulating layers of a relatively thin thickness of large storage tanks for storing the high and low temperature liquid, cold storage warehouses, etc. In USA, the spraying method is also widely used for heat insulating the roofs.

The spraying apparatus used for forming hard polyurethane coatings is substantially similar in principle to that used for spraying paint or the like, and comprises storage tanks for storing polyurethane foam feed stock, pumps, pipes or hoses and a spray gun. In general, the hard polyurethane foam feed stock consists of two feed stock components in the form of liquid and they are solidified in a moment after being mixed with each other. For this reason, two storage tanks, two pumps and two feed or supply lines are provided in the spraying apparatus and the two feed stock components must be mixed with each other immediately before or after they are sprayed by the spray gun. In some cases, the hard polyurethane foam feed stock consists of three liquid components.

The spraying method is relatively simple in principle as described above, but since the foaming, which is very complex both physically and chemically, takes place on the surface to be treated, the ratio of flow rates of the two liquid feed stock components as well as their temperature must be strictly controlled. Furthermore the conventional manual spraying method has the problems that the thickness of the coating layer must be precisely controlled only by the skilled and experienced workers and that the working conditions are harmful to the workers because the mist of the feed stock is sprayed.

In the extensive studies and experiments conducted by the inventors for developing the satisfactory method for insulating the liquefied natural gas storage tanks, they found out that the hard polyurethane foam coatings formed by the spraying method are more smooth and uniform than those formed by the pouring method using the molds or the like and are free from molding distortions so that they are best adapted for use as the heat insulating material for low temperature liquid. However, the surfaces of the storage tanks to be treated are very large in size and the spraying operations must be strictly controlled so that a novel spraying apparatus must be devised.

SUMMARY OF THE INVENTION

In view of the above, the primary object of the present invention is to provide an automatic spraying apparatus used for forming hard polyurethane foam coatings which apparatus may substantially overcome the problems encountered in the conventional manual spraying methods and apparatus and which may form the uniform hard polyurethane foam coating of a predetermined thickness upon a large surface to be treated.

Briefly starting, an automatic spraying apparatus in accordance with the present invention comprises storage tanks each storing therein each one of at least two liquid components which are mixed to produce hard polyurethane foam, a pump for feeding said each liquid component, a spray gun for mixing said liquid components fed from said pumps and spraying the mixture, a mechanism for displacing said spray gun in a plane spaced apart from and substantially in parallel with a surface to be sprayed, and a control unit for controlling the displacement of said spray gun so as to follow a predetermined path.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
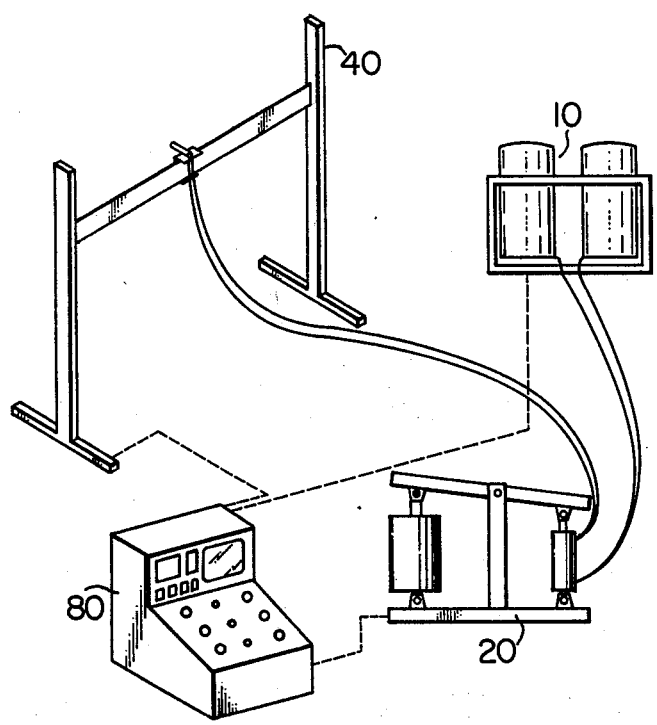
FIG. 1 is a perspective view of an automatic spraying apparatus in accordance with the present invention.

FIG. 1 shows the general arrangement of the automatic spraying apparatus in accordance with the present invention comprising a liquid feed stock supply unit 10, a pump unit 20, a spray gun unit 40 and a control box 80.

Figure 2:
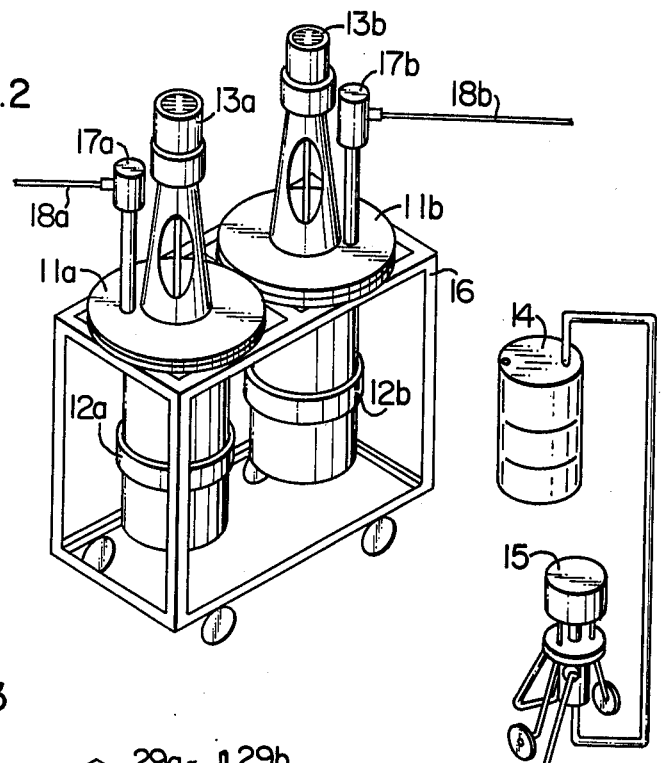
FIG. 2 is a perspective view of a liquid feed stock storage unit thereof.

The liquid feed stock supply unit shown in FIG. 2 supplies two liquid feed stock components and comprises storage tanks 11a and 11b with temperature control heaters 12a and 12b and mixers 13a and 13b, each tank being supplied with one of the liquid feed stock components by a pump through a pipe line and having a liquid level meter (the latter three are not shown). Even though a cleaning solvent storage tank 14 and a solvent pump 15, both of which are used for cleaning a spray gun, are not mounted on a carriage 16 for the sake of simplicity in FIG. 2, it is preferable to mount them on the carriage 16. The liquid feed stock components in the storage tanks 11a and 11b are pumped up by transfer pumps 17a and 17b respectively, which are preferably of the air driven piston type in order to maintain the constant discharge pressure, and flow through respective feed lines 18a and 18b to the next unit.

Figure 3:
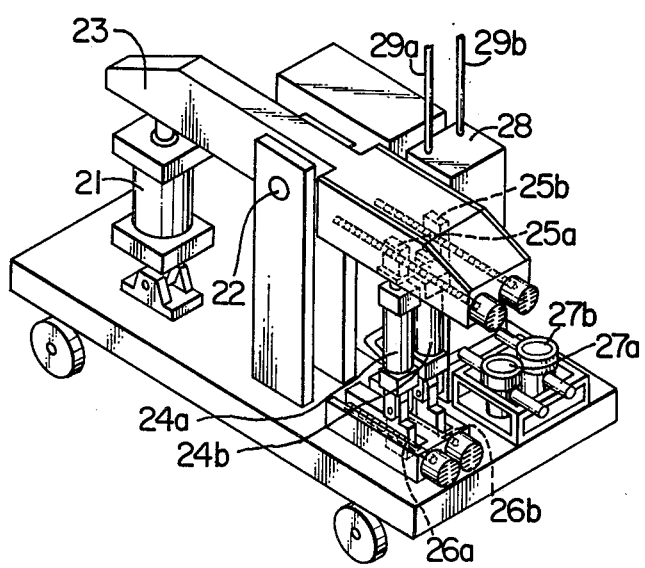
FIG. 3 is a perspective view of a pump unit.

The pump unit 20 shown in FIG. 3 is of the piston type and comprises a driving air cylinder 21, a lever 23 pivoted at 22 and double-action type liquid feed stock charging cylinders 24a and 24b. The distances from the pivotal point 22 of the lever 23 to the chargeing cylinders 24a and 24b are individually adjustable by upper and lower sliding distance adjusting mechanisms 25a, 25b, 26a and 26b so that the respective discharge rates and combined flow rate of the two liquid feed stock components may be suitably varied within predetermined ranges. The respective discharged liquid feed stock components are heated by a heater 28 to a suitable temperature and are forced to flow to the spray gun through insulated feed lines 29a and 29b.

Figure 4:
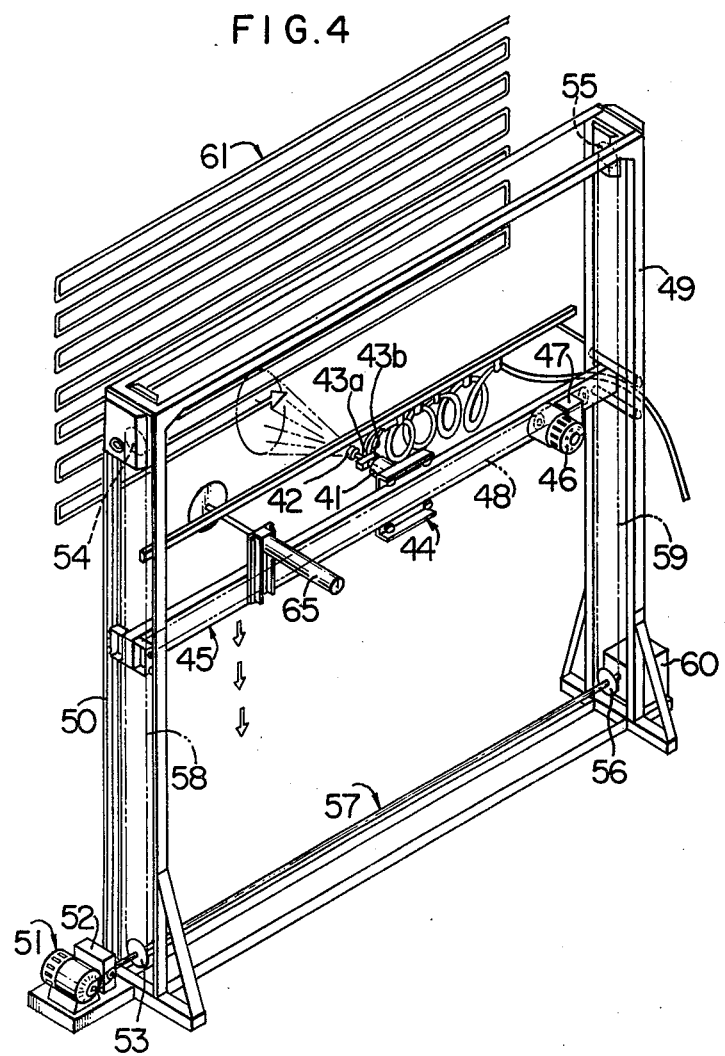
FIG. 4 is a perspective view of a spray gun unit.

In the instant embodiment, the spray gun unit shown in FIG. 4 is so arranged as to spray the liquid feed stock on a vertical surface, and a spray gun 41 with a spray nozzle 42 and inlet ports 43a and 43b for the respective liquid feed stock components is mounted on a carriage 44. The two liquid feed stock components charged into the spray gun 41 is mixed with each other only within a short passage from their inlet ports 43a and 43b to the nozzle 42. The spray gun carriage 44 is mounted on a horizontal traverse bar 45 disposed in parallel with the surface to be treated and is reciprocated along the traverse bar 45 by a chain 48 which passes over sprocket wheels at the ends of the traverse bar 45 and is driven by a traverse driving motor 46 with a reduction gear. A pulse generator 47 is further mounted on the traverse bar 45 for detecting the number of rotations of the reduction gear. The traverse bar 45 is vertically movable along a pair of vertical frames 49 and 50 by a vertical feed mechanism comprising a motor 51, a reduction gear 52, sprocket wheels 53, 54, 55 and 56, a connecting shaft 57, and chains 58 and 59 passing over the sprocket wheels. Another pulse generator 60 for detecting the number of rotations of the sprockets 53 and 54 is attached to the free end of the connecting shaft 57.

The spray gun 41 is, therefore, movable in both the vertical and horizontal directions within the vertical frames 49 and 50 so that the center of the sprayed liquid can move, for instance, along the path 61.

Next the control unit, which constitutes the important feature of the present invention, will be described hereinafter. Since the instant embodiment is of the high pressure airless spraying type, the dried air or nitrogen slightly higher than the atmospheric pressure is charged into the storage tanks 11a and 11b in order to prevent the contact of the liquid feed stock with the moisture in the atmosphere. The liquid feed stock is also maintained at a temperature less than about 25° C. in order to prevent the dissipation of a foaming agent such as Freon (trademark for du Pont). The discharge pressure of the transfer pumps 17a and 17b is of the order of a few kilograms per square centimeter which is sufficient to provide a suitable back pressure for the high pressure pumps 24a and 24b. Since the liquid feed stock for polyurethane foam has a relatively high viscosity of the order of 500 to 1,000 cps, it is required for the airless spraying that the pump unit 20 increases the pressure of the liquid feed stock to 100 kg/cm$^2$ and the heater 28 increases the temperature thereof to 50° C. For this purpose, pressure and temperature sensors (not shown) are inserted in the feed lines 29a and 29b at the position as close to the spray gun as possible and the pressure and temperature of the liquid feed stock detected by those sensors are fed back to a control unit to control the air pressure of the driving air cylinder 21 and the power of the heater 28 such that the pressure and temperature of the liquid feed stock may be maintained exactly at required values as indicated above. The mixing ratio of the two liquid feed stock components is dependent upon the composition thereof, and must be maintained always at a predetermined ratio during the spraying operation. The mixing ratio is one of the most important factors which effect the quality of the polyurethane foam coating.

Figure 5:
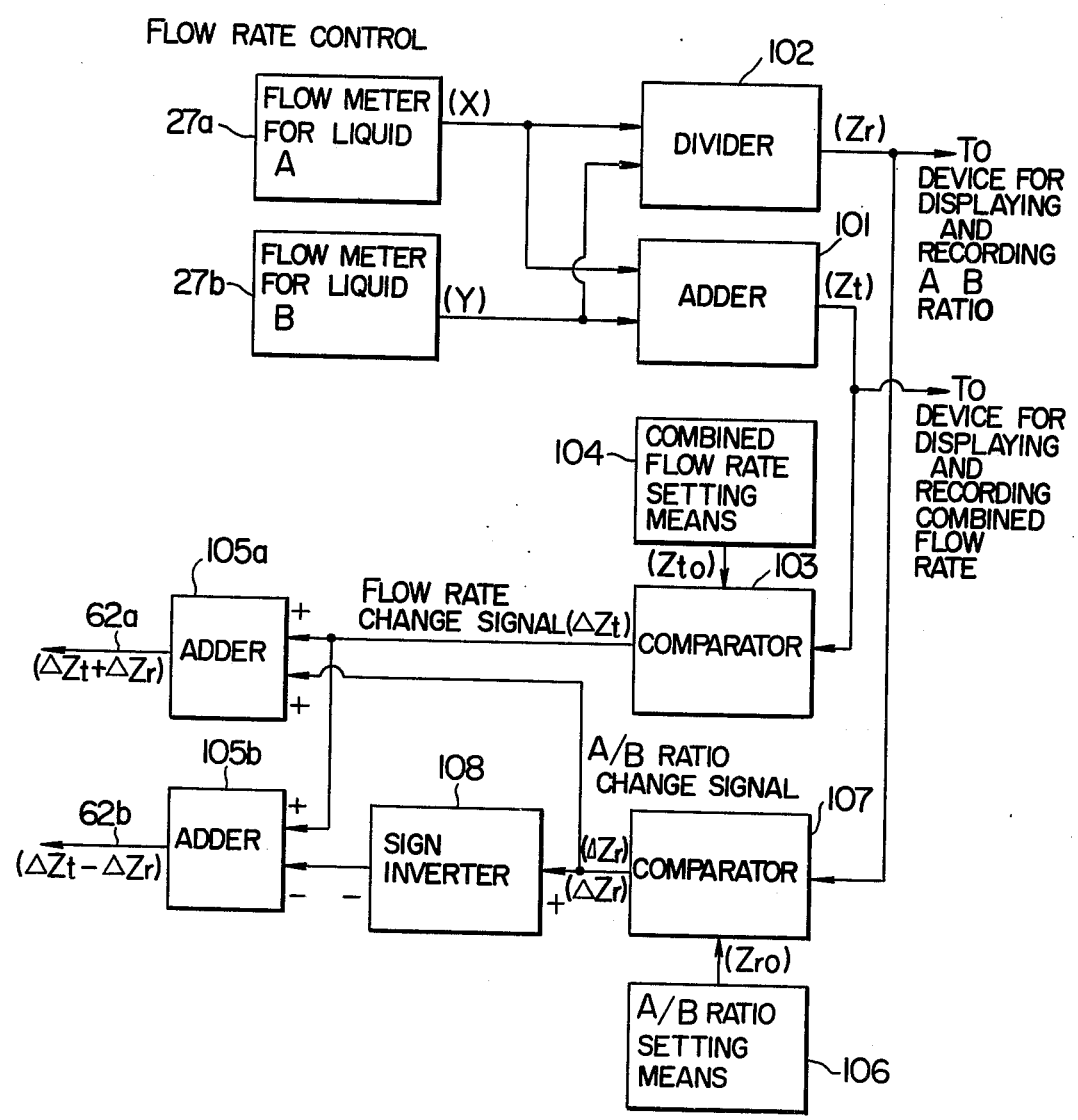
FIG. 5 is a block diagram of an electrical circuit for controlling the flow rates of liquid feed stock components.

FIG. 5 shows a control circuit for always maintaining the combined flow rate and the mixing ratio of the two liquid feed stock components at respective predetermined values during the spraying operation. The flow meters 27a and 27b issue signals (X) and (Y) representing flow rates of liquid feed stock components A and B, respectively, detected therethrough and transmit these signals (X) and (Y) to an adder 101 and a divider 102. The adder 101 makes the addition of signals (X) and (Y) and produces an output signal ($Z_t$) which represents the sum of detected flow rates of liquids A and B. The output signal ($Z_t$) is sent to a device for displaying and recording the combined flow rate of liquids A and B and to one of inputs of a comparator 103. A signal ($Z_{to}$) representing a reference sum of flow rates of liquids A and B to be maintained constant during the spraying operation is previously set in a combined flow rate setting means 104 and is applied to the other input of the comparator 103. The comparator 103 compares the signal ($Z_t$) with the signal ($Z_{to}$) and issues an output signal ($\Delta Z_t$) the level of which corresponds to the difference between those of signals ($Z_{to}$) and ($Z_t$). The output signal ($\Delta Z_t$) from the comparator 13 is applied to a flow rate change signal to one of inputs of each of two adders 105a and 105b.

Figure 6A:
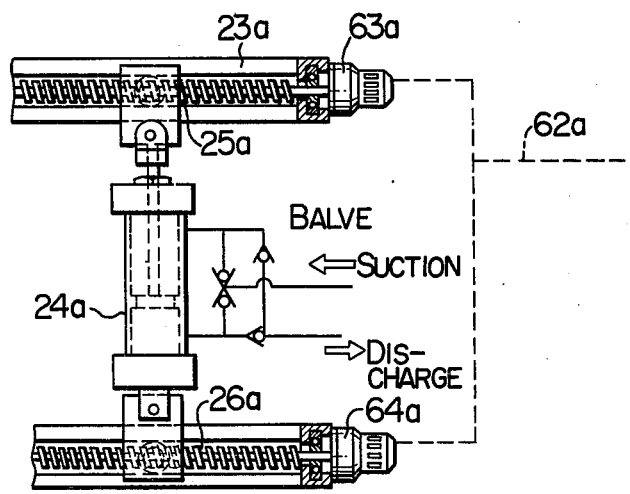
FIGS. 6a and 6b are fragmentary views, on enlarged scale of FIG. 3 showing pump discharge rate adjusting mechanisms for respective feed stock components.
Figure 6B:
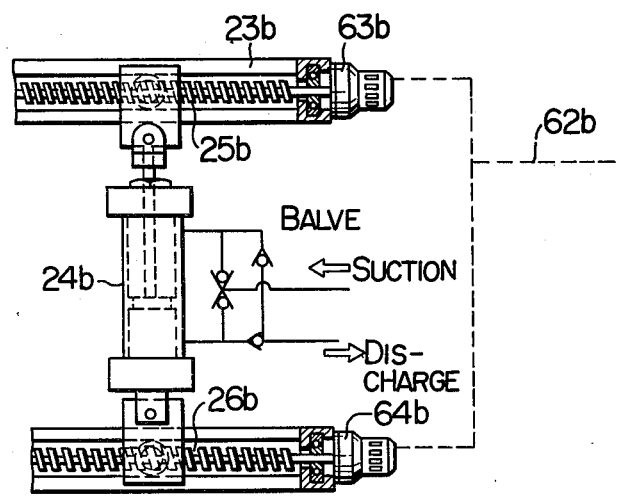

The divider 102 makes the division of signals (X) and (Y) and produces an output signal ($Z_r$) which represents the ratio (X/Y) of detected flow rates of liquids A and B. A signal ($Z_{ro}$) representing a reference ratio of flow rates of liquids A and B to be maintained constant during the spraying operation is previously set in a ratio setting means 106. The signals ($Z_r$) and ($Z_{ro}$) are applied to respective inputs of a comparator 107 and compared therein with each other. The comparator 107 issues an output signal ($\Delta Z_r$) the level of which corresponds to the difference between those of signals ($Z_{ro}$) and ($Z_r$). The output signal ($\Delta Z_r$) of the comparator 107 is applied as a ratio change signal to the other input of the adder 105a directly and to the other input of the adder 105b through a sign inverter 108 through which the sign of the signal ($\Delta Z_r$) is inverted to apply a signal ($-\Delta Z_r$) to the adder 105b. The adder 105a makes the addition of input signals ($\Delta Z_t$) and ($\Delta Z_r$) and produces an output signal ($\Delta Z_t + \Delta Z_r$) which in turn is transmitted through a line 62a to the motors 63a and 64a shown in FIG. 6a to energize them. On the other hand the adder 105b makes the addition of input signals ($\Delta Z_t$) and ($-\Delta Z_r$) and produces an output signal ($\Delta Z_t - \Delta Z_r$) which in turn is transmitted through a line 62b to the motors 63b and 64b shown in FIG. 6b to energize them.

The motors 63a and 64a rotates in a same direction to displace the cylinder 24a of the pump unit 20 while holding it upright through the upper and lever adjusting mechanisms 25a and 26a, so far as the adder 105a issues the output signal. When the output signal of the adder 105a is positive, the motors 63a and 64a will rotate in the normal direction to displace the cylinder 24a away from the pivotal point 22 of the lever 23 (see FIG. 3) so as to increase the flow rate of the liquid A. On the contrary, when the output signal of the adder 105a is negative, the motors 63a and 64a will rotate in the reverse direction to displace the cylinder 24a toward the pivotal point 22 so as to decrease the flow rate of the liquid A.

In the like manner the other pair of motors 63b and 64b serve to displace the cylinder 24b away from or toward the pivotal point 22 so as to increase or decrease the flow rate of the liquid B in dependence on whether the output signal of the adder 105b is positive or negative. In this manner the both of the sum and the ratio of flow rates of liquids A and B are automatically controlled toward the predetermined reference sum and ratio and when these detected values become equal to the reference values, the comparators 103 and 107 issue no output signals ($\Delta Z_t$) and ($\Delta Z_r$) so that the adders 105a and 105b do not produce output signals to drive the motors 63a, 64a, 63b and 64b thereby stopping the displacement of the cylinders 24a and 24b.

The combined flow rate of the two liquid feed stock components and the mixing ratio thereof may be maintained with higher accuracy by the flow rate control circuit and flow rate adjusting mechanism described above. In general, the error in mixing ratio of the order of ±3% is permissible, but in accordance with the present invention the error in mixing ratio is within ±1%.

The feed of the spray gun may be controlled by limit switches, which is the simplest method, but it is not convenient to change the feed; that is, the displacement of the spray gun by a remote control system when the limit switches are used. The present invention, therefore, employs a numerical control system for controlling the feed of the spray gun as will be described in detail hereinafter with reference to FIG. 7.

Figure 7:
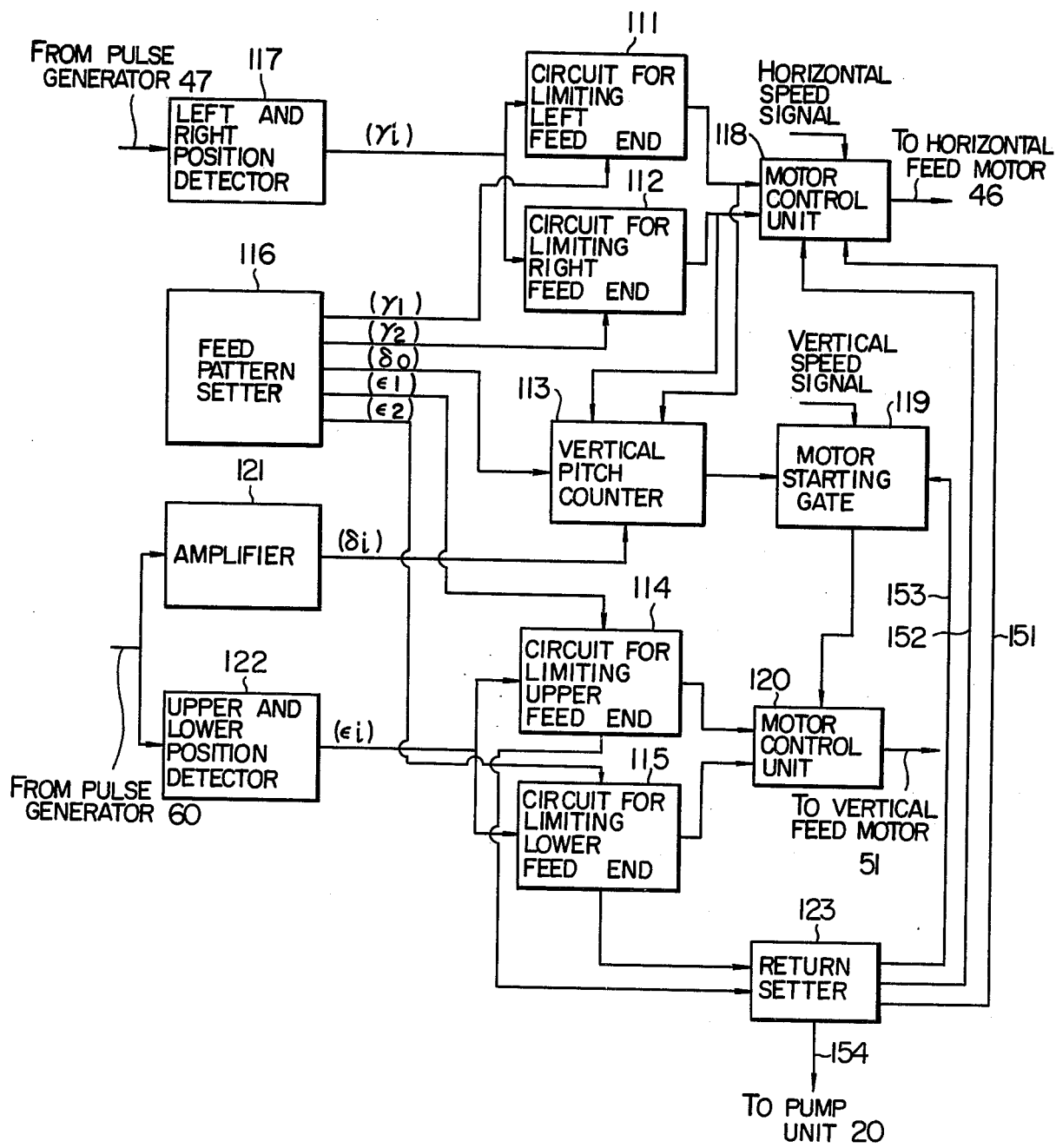
FIG. 7 is a block diagram of an electrical circuit for controlling the displacement of a spray gun.

FIG. 7 shows a control circuit for displacing the spray gun 41 to spray the liquid feed stock on the vertical surface along the path 61 as shown in FIG. 4. The left and right end positions of reciprocations of the gun carriage 44 along the traverse bar 45 are represented by electric signals ($\gamma_1$) and ($\gamma_2$) such as voltages, the levels of which may be so determined as to correspond to distances from the frame 50 on the left as viewed in FIG. 4 to the left and right end positions, respectively. These signals ($\gamma_1$) and ($\gamma_2$) are previously set in a circuit for limiting left feed end 111 and a circuit for limiting right feed end 112. A digital signal ($\delta_o$) representing one pitch length of intermittent vertical movement of the traverse bar 45 is previously set in a vertical pitch counter 113. Further signals ($\epsilon_1$) and ($\epsilon_2$) such as voltages representing the upper and lower end positions of vertical movement of the traverse bar 45, at which the traverse bar 45 is turned back upward or downward, are previously set in a circuit for limiting upper feed end 114 and a circuit for limiting lower feed end 115, respectively. The above preset signals ($\gamma_1$), ($\gamma_2$), ($\delta_o$), ($\epsilon_1$) and ($\epsilon_2$) can be adjusted by means of a feed pattern setter 116.

In operation, pulse generators 47 and 60 (see (FIG. 4) issue one pulse signal every time the spray gun 41 is fed horizontally and vertically by a predetermined distance, e.g. 5 mm. The pulse signals have positive or negative sign in dependence on whether the gun 41 moves rightwardly or leftwardly and downwardly or upwardly as viewed in FIG. 4. The pulse signals issued from the pulse generator 47 are transmitted to a left and right position detector 117 in FIG. 7 to be counted therein. The detector 117 produces an electrical signal ($\gamma_i$) such as voltage in the level corresponding to the number of pulses counted therein and transmits the signal ($\gamma_i$) to circuits 111 and 112 to compare it with signals ($\gamma_1$) and ($\gamma_2$) previously set in these respective circuits. During rightward movement of the gun 41, the signal ($\gamma_i$) increases in its level and when the signal ($\gamma_i$) reaches the same level as that of the signal ($\gamma_2$) in the circuit 112, a left feed starting signal is issued from the circuit 112 and transmitted through a motor control unit 118 to the horizontal feed motor 46 for reversing the rotation of the motor 46 thereby changing the movement of the gun carriage 44 from right to left. The motor control unit 118 has another input for a horizontal speed signal to control the motor 46 to rotate at a predetermined speed of the level corresponding to the horizontal speed signal. During leftward movement of the gun 41, the signal ($\gamma_i$) issued from the detector 117 decreases in its level, since in this instance the detector 117 receives negative pulse signals from the pulse generator 47, and when the signal ($\gamma_i$) decreases to the same level as that of the signal ($\gamma_1$) in the circuit 111, a right feed starting signal is issued from the circuit 111 and transmitted through the motor control circuit 118 to the horizontal feed motor 46 for reversing the rotation of the motor 46 thereby changing the movement of the gun carriage 44 from left to right. In this manner the gun carriage 44 reciprocates along the traverse bar 45 between left and right feed end positions.

At the same time as the right and left feed starting signals are issued, the circuits 111 and 112 further send a vertical feed starting signal to the vertical pitch counter 113 so as to clear pulses counted during preceding vertical movement over one pitch to reset the counter to 0 and simultaneously to issue from the counter 113 a signal to open a motor starting gate 119 thereby sending a vertical speed signal through a motor control unit 120 to the vertical feed motor 51 in FIG. 4 to cause the latter to rotate in the normal direction at a speed of a level corresponding to the vertical speed signal. During the normal rotation of the motor 51, the traverse bar 45 is displaced downwardly and the pulse generator 60 issues positive pulse signals which are sent on one hand through an amplifier 121 to the vertical pitch counter 113 to be counted therein and on the other hand to an upper and lower position detector 122. When the counted value ($\delta_i$) of pulse signals from the pulse generator 60 becomes equivalent to the preset value ($\delta_o$) in the counter 113, the counter 113 issues a signal to close the motor starting gate 119 thereby stopping the vertical feed motor 51. In this manner the traverse bar 45 is displaced downwardly by one pitch every time the gun carriage 44 arrives at the left or right feed end so that the gun 41 traces the path 61 as shown in FIG. 4.

The upper and lower position detector 122 produces an electric signal ($\epsilon_i$) such as voltage in the level corresponding to the number of pulses counted therein and transmits the signal ($\epsilon_i$) to the circuits for limiting upper and lower feed ends 114 and 115 to compare it with signals ($\epsilon_1$) and ($\epsilon_2$) previously set in these respective circuits. When the traverse bar 45 is lowered to the lower end position so that the signal ($\epsilon_i$) reaches the same level as that of the signal ($\epsilon_2$) in the circuit 115, an upper feed starting signal is issued from the circuit 115 and transmitted through the motor control unit 120 to the vertical feed motor 51 to reverse the rotational direction thereof thereby moving back the traverse bar 45 upwardly. At this time the circuit 115 further issues a return starting signal to be transmitted to a return setter 123. Upon receiving the return starting signal, the return setter 123 sends a liquid feed stopping signal through a line 154 to the pump unit 20, a left feed starting signal and a right feed stopping signal through a line 151 and a line 152, respectively, to the motor control unit 118, and an upper continuous feed signal through a line 153 to the motor starting gate 119. Due to issue of these signals from the return setter 123, the pump unit 20 stops to feed the feed stock components to the gun 41, the vertical feed motor continues to feed the traverse bar 45 upwardly disregarding that the vertical pitch counter issues the signal to close the motor starting gate 119 when the vertical feed of the traverse bar 45 is made by the predetermined one pitch, the gun carriage 44 is forced to move leftwardly even if it is travelling rightwardly at the lower feed end position of the traverse bar and thereafter when the gun carriage 44 arrives at its left feed end position, it is not turned back toward right and remains to stop at the left feed end position until the traverse bar 45 arrives at the upper feed end position. When the traverse bar 45 arrives at the upper feed end position so that the level of the signal ($\epsilon_i$) from the detector 122 becomes equivalent to that of the preset signal ($\epsilon_1$) in the circuit for limiting upper feed end 114, a lower feed starting signal is issued from the circuit 114 and transmitted through the motor control unit 120 to the vertical feed motor 51 to reverse the rotational direction thereof thereby feeding the traverse bar 45 downwardly again. At this time the circuit 114 further sends a return-off-signal to the return setter 123 to render the latter inoperative so that the pump unit 20 feeds again the feed stock components to the gun 41 and the gun carriage 44 starts from the left feed end position toward the right feed end position and reciprocates along the traverse bar 45 between the both end positions while the traverse bar 45 is intermittently displaced downwardly in the manner as mentioned above. In this manner, during the downward movement of the traverse bar 45 the feed stock is sprayed upon the vertical surface along the path 61 as shown in FIG. 4 and during the upward movement of the traverse bar 45 the spray gun 41 is returned to the original position, that is the upper left feed end position, without spraying the feed stock.

Although the control circuit as explained above with reference to FIG. 7 has been arranged to effect spraying operations only in downward displacement of the traverse bar 45, it will be understood that if the return setter 123 is cancelled from the circuit in FIG. 7, spraying operations can be effected in both downward and upward displacements of the traverse bar. In this latter case it will be required that a detector 65 for detecting the thickness of the polyurethane foam coating (See FIG. 4, which will be explained in detail hereinafter, is made inoperative only during the upward displacement of the traverse bar 45 or is arranged to be slightly displaced upwardly or downwardly with respect to the traverse bar in accordance with the upward or downward displacement of the traverse bar so as to always measure the thickness of a part of the coating preceding the part under spray.

The detector 65 for detecting the thickness of the polyurethane foam coating is also mounted on the traverse bar 45. The thickness of the coating by one spraying operation is preferably within 25 mm, and when the thickness greater than 25 mm is required, the coating layers must be laminated; that is, the spraying operations must be repeated. For this purpose, the coating thickness detector is provided in order to detect the thickness of the coating formed by the previous spraying operation or operations so that the thickness of the coating to be formed by the next operation may be suitably controlled.

Figure 8:
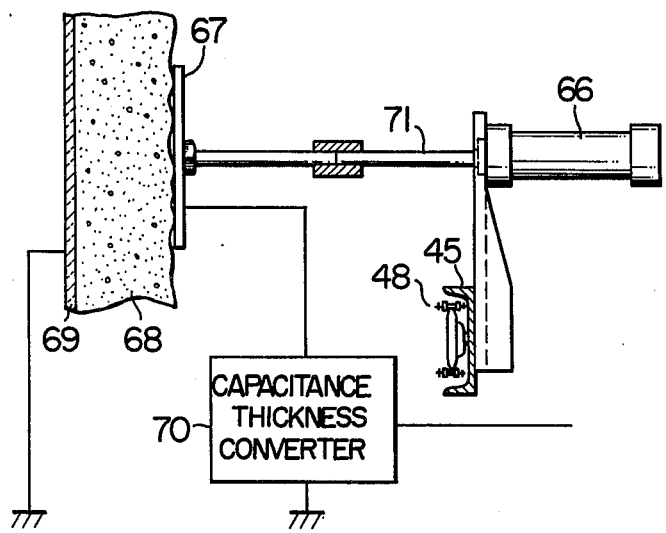
FIG. 8 is a schematic diagram of a detector for detecting the thickness of the hard polyurethane foam coating.

FIG. 8 shows the thickness detector 65 of the capacitance thickness gage type for detecting the thickness of the coating over a metal surface 69. A metal plate 67 is pressed against the coating layer 68 by an air cylinder 66 so that the electrostatic capacitance between the plate 67 and the metal surface 69 is detected by a converter 70 as the measure of thickness. For this purpose, the cylinder shaft 71 must be made of an insulating material. According to the intermittent drawnward displacement of the traverse bar 45, the metal plate 67 is intermittently retracted from the coating layer 68 and the thickness of the coating is measured while keeping on spraying and every time the traverse bar 45 is made stationary after being lowered by one pitch. The measurement by the detector 65 is conducted at a level slightly lower than the level at which the coating is being formed by the spray gun 41, preferably lower than the latter by one or two pitches of the vertical displacement of the bar 45, so as not to contaminate the metal plate 67. Based upon the measured thickness, the quantity of the liquid feed stock to be sprayed per unit area of the coating at the next level is determined from a theoretical formula representing the relationship between the quantity and the thickness. For the control of the quantity of the liquid feed stock to be sprayed, it may be easier to change the traverse feed speed of the spray gun than to change the discharge rate of the pump unit 20.

Figure 9:
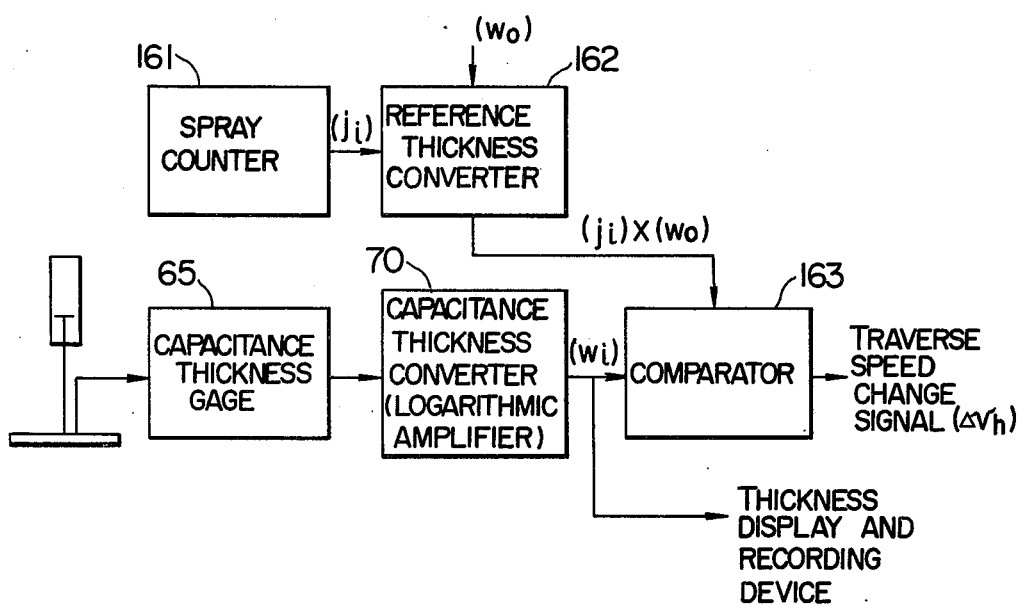
FIG. 9 is a block diagram of an electrical circuit used in the detector shown in FIG. 8.

FIG. 9 is the block diagram of a circuit for controlling the thickness of the coating. In a reference thickness converter 162 is previously set a reference signal ($w_o$) such as voltage corresponding to a thickness of the coating to be formed in every one spray operation. A spray counter 161 counts the number of cyclic spray operations and send a signal ($j_i$) corresponding to the counted number to the reference thickness converter 162 every time one cycle of spray operation has been completed. The reference thickness converter 162 multiplies the reference signal ($w_o$) by the signal ($j_i$) and sends a signal ($j_i$)×($w_o$) corresponding to the product of the signals ($j_i$) and ($w_o$) to a comparator 163. The capacitance thickness gage 65 intermittently measures the electrostatic capacitance representing the thickness of the coating already formed in previous spray operations and at a level slightly lower than the level at which a further coating layer is being laminated upon the previous coating by the traversing spray gun, as stated above. The measured capacitance which is in inverse proportion to the square of the thickness of the coating is converted into a voltage signal corresponding to the thickness and logarithmically amplified through the capacitance thickness converter 70 and transmitted as a signal ($w_i$) to a device for displaying and recording the measured thickness and to the comparator 163. The comparator 164 determines an increment ($\Delta\lambda$) of the quantity ($\lambda$) of the feed stock to be sprayed per unit area of the coating in one cycle of spraying operation from the difference ($\Delta w$) between signals ($w_o$) and ($w_i$) and produces a signal ($\Delta v_h$) representing a decrement of the traverse speed ($v_h$) of the gun carriage 44, which decrement is determined from the increment ($\Delta v$) of the feed stock quantity on the basis of a relationship between the quantity ($\lambda$) and the traverse speed ($v_h$) predetermined when the pump unit 20 is operated at a constant total flow rate. The level of the horizontal speed signal to be applied to the motor control unit 118 in FIG. 7 is reduced by a level corresponding to signal ($\Delta v_h$) so as to decrease the speed of the horizontal feed motor 51 and thus the traverse speed ($v_h$) of the gun carriage 44 by a level corresponding to the signal ($\Delta v_h$) and as a result to increase the quantity ($\lambda$) of the feed stock to be sprayed per unit area of the coating by the increment ($\Delta\lambda$). When the increment ($\Delta\lambda$) is negative, the traverse speed ($v_h$) of the gun carriage 44 is increased thereby to decrease the quantity ($\lambda$). In this manner the deviation of the thickness of the coating formed in previous spraying operations from the reference thickness is corrected in the next spraying operation.

According to the present invention, when the coating of 100 mm in thickness is formed by five spray operations, the average error in final thickness is of the order of ±3 mm.

The control circuits described above are mounted within the control box 80 (See FIG. 1), upon which are further mounted indicators, recorders, operating buttons and so on. The remote control of the spray gun may be further facilitated when a television camera is set at one end of the traverse bar 45 so that the operator may monitor the operation on a television receiver mounted on the control box.

The spraying apparatus described in detail above is characterized by the systematization of the detection of various operation factors and the control mechanisms so that the present invention must not be limited to the individual mechanisms.

The spraying apparatus is best adapted for spraying the coatings for a LNG vessel with the spraying gun unit of the dimensions suitable for actual spraying operation disposed within the vessel while the other units installed in a control room on the deck where the working conditions are favorable so that the automatic insulating coating operation and the labor saving may be effected.

What is claimed is:

1. An automatic spraying apparatus comprising storage tanks, each storing therein one of at least two liquid components which are mixed to produce hard urethane foam; a pump for feeding said each liquid component under pressure; a spray gun for mixing said liquid components fed from said pumps and spraying the mixture; a means displacing said spray gun in a plane spaced apart from and substantially in parallel with a surface to be sprayed, said means comprising a traverse bar, a carriage having mounted thereon said spray gun and being movably mounted upon said traverse bar, a first motor for moving said carriage along said traverse bar, a second motor for displacing said traverse bar in a direction perpendicular to the axis of the said traverse bar in said plane, a first pulse generator for issueing pulse signals the number of which corresponds to the displacement of said carriage, a second pulse generator for issueing pulse signals the number of which corresponds to the displacement of said traverse bar, a first control means in response to said pulse signals from said first pulse generator for reversing the rotation of said first motor when said carriage arrives at either end of said traverse bar, and a second control means for energizing said second motor at the same time as the rotation of said first motor is reversed and de-energizing said second motor in response to said pulse signals from said second pulse generator when the displacement of said traverse bar after energization of said second motor reaches a predetermined level; and a pump control circuit comprising a flow meter for detecting the discharge rate of said each pump, means for combining output signals from said flow meters to produce the sum of the detected discharge rates of said pumps, means for dividing output signals from said flow meters to produce the ratio of the detected discharge ratio of said pumps, a first comparator means for comparing said sum of the detected discharge rates with a predetermined total discharge rate of said pumps, a second comparator means for comprising said ratio of the detected discharge rates with a predetermined ratio of discharge rates of said pumps, and means operating in response to output signals from said first and second comparator means and for controlling the discharge rate of said each pump at a predetermined rate determined from said predetermined total discharge rate and said predetermined discharge ratio.

2. An automatic spraying apparatus as claimed in claim 1, wherein said spray gun displacing means further comprises first and second feed and control means for reversing the rotation of said second motor when said traverse bar arrives at ends of the displacement thereof.

3. An automatic spraying apparatus as claimed in claim 2, further comprising a means mounted on said traverse bar for measuring the thickness of a hard urethane foam coating formed upon a part of the surface which is located at a level preceding another part of the surface under spray, a circuit for instructing the thickness of the hard urethane foam to be laminated upon the existing coating by comparing the thickness determined by said measuring means with a predetermined reference thickness and a control means for controlling the discharge rates of said pumps or the traverse speed of said spray gun in response to instructions from said instructing circuit.

4. An automatic spraying apparatus as claimed in claim 3 for producing a hard urethane foam coating upon a surface of a metallic member, wherein said thickness measuring means comprises a metal plate adapted to be placed in abutting relation with the surface of the coating and means for determining capacitance between said metal plate and said metallic member.

5. An automatic spraying apparatus as claimed in claim 4, wherein said metal plate is operatively connected to an air cylinder mounted on said traverse bar so as to be retracted from the surface of the coating during displacement of said traverse bar.

6. An automatic spraying apparatus as claimed in claim 5, further comprising means for stopping said pumps and keeping said second motor to be energized independently of the predetermined displacement of said traverse bar during the time interval from actuation of one of said feed end control means to actuation of the other feed end control means.

* * * * *